May 24, 1932.  B. B. GEYER  1,860,325
REFRIGERATING APPARATUS
Filed March 31, 1930   2 Sheets-Sheet 1
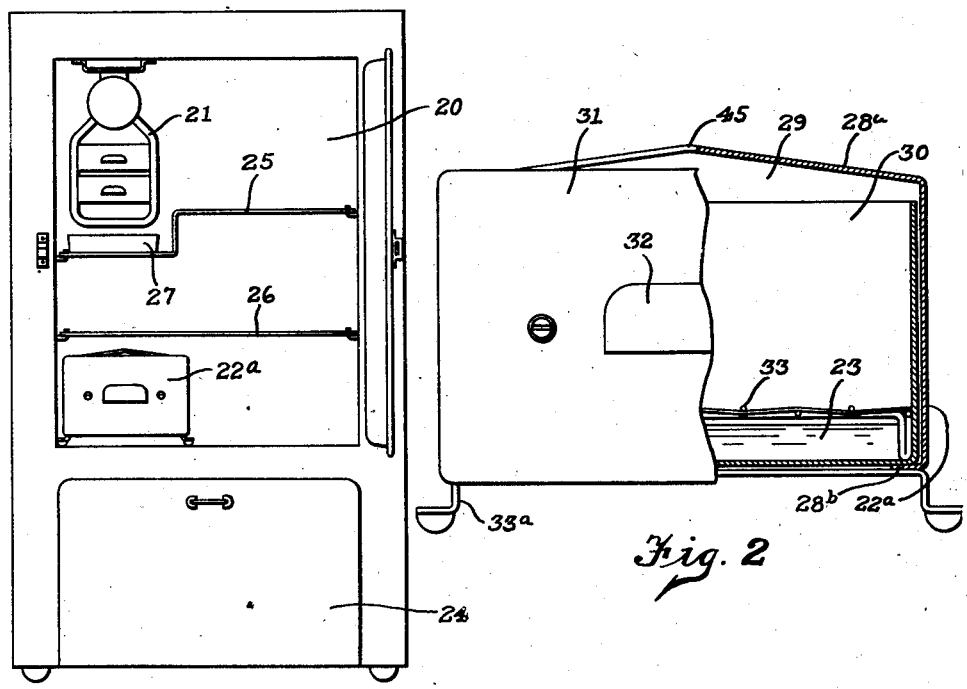
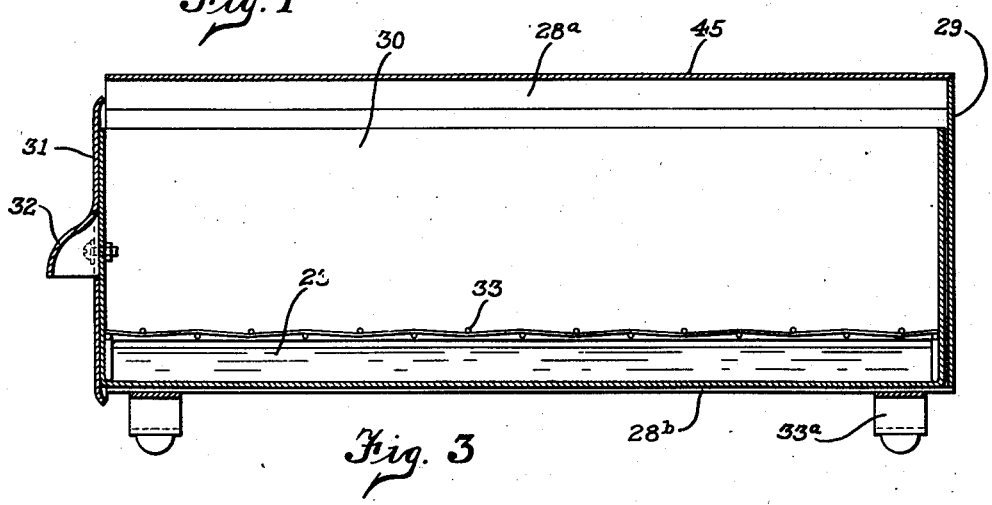

May 24, 1932.                B. B. GEYER                1,860,325
                        REFRIGERATING APPARATUS
                        Filed March 31, 1930        2 Sheets-Sheet 2
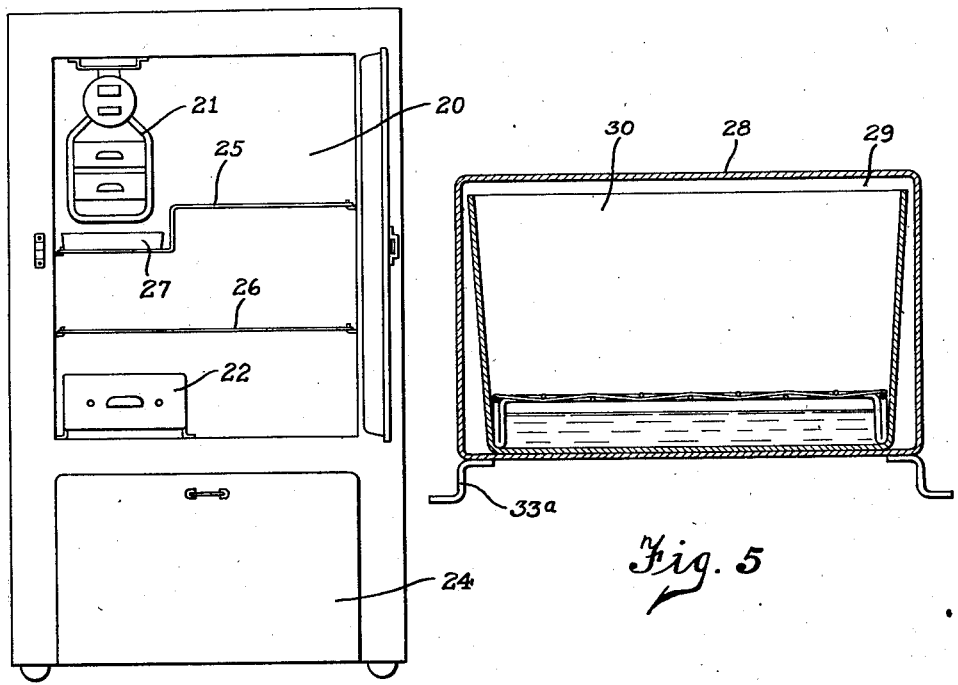
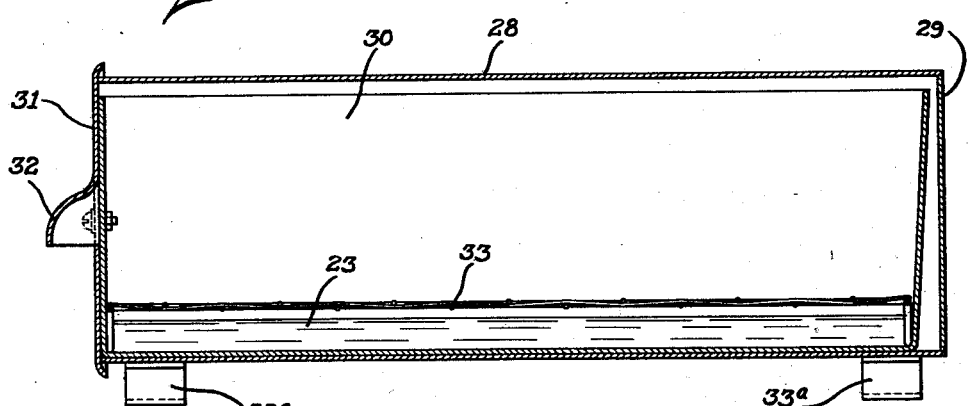

Patented May 24, 1932

1,860,325

UNITED STATES PATENT OFFICE

BERTRAM B. GEYER, OF DAYTON, OHIO, ASSIGNOR TO FRIGIDAIRE CORPORATION, OF DAYTON, OHIO, A CORPORATION OF DELAWARE

REFRIGERATING APPARATUS

Application filed March 31, 1930. Serial No. 440,555.

This invention relates to refrigerating apparatus, and particularly to an apparatus for and the method of refrigerating vegetables in order to maintain or restore their original crispness.

An object of this invention is to provide a method of and apparatus for refrigerating vegetables in a mechanically cooled refrigerator, for instance of the domestic type, so that the vegetables may be maintained in their original crispness for extended periods of time or restored to their original crispness.

Further objects and advantages of the present invention will be apparent from the following description, reference being had to the accompanying drawings, wherein a preferred form of the present invention is clearly shown.

In the drawings:

Fig. 1 is a front view of a cabinet embodying features of this invention;

Fig. 2 is a front elevation, partly in vertical cross-section, of a portion of Fig. 1;

Fig. 3 is a vertical cross-sectional view taken transversely to Fig. 2;

Fig. 4 is a view similar to Fig. 1 and showing a modified form;

Fig. 5 is a vertical cross-sectional view of a portion of the apparatus shown in Fig. 4; and Fig. 6 is a vertical cross-sectional view taken transversely to Fig. 5.

A method of refrigeration, according to this invention, comprises setting up a major circulation of air by means of a mechanical refrigerating apparatus in a relatively large air-circulating, insulated compartment for the refrigeration of various foods and the refrigeration of vegetables in said relatively large air-circulating, insulated compartment by subjecting the vegetables in the presence of free water in a relatively small, substantially closed compartment within said relatively large compartment to a restricted minor circulation of air into and out of said small compartment. By this method a relatively dry air is maintained in the relatively large air-circulating, insulated compartment and a relatively moist, but cold air is circulated within the small compartment. This insures that the cells of the vegetables which contain substantially the same amount of water which they contain when the vegetables are fresh, and also prevents the formation of mold on the vegetables. These conditions are maintained for surprisingly long periods of time by the practice of this invention.

This method is preferably practiced in a mechanically refrigerated insulated compartment of the type, for instance, known as a domestic mechanical refrigerator. Preferably the vegetables are stored in a relatively small vegetable compartment, preferably metallic, within the relatively large air-circulating, insulated compartment of the domestic refrigerator, and preferably the vegetables are stored in the presence of water in the relatively small vegetable compartment. The relatively small vegetable compartment is placed in thermal exchange with the relatively large insulated compartment, and, in the preferred embodiment, a restricted air passage is provided between the compartments so that a slight evaporation of water or circulation of air is accomplished within the vegetable compartment in order to prevent the growth of molds within said compartment. The construction of the refrigerator is such that the air circulating within the relatively large compartment is refrigerated below 32° F. when passing over the mechanical unit, and this air then circulated in contact with the relatively small vegetable compartment while still at a temperature below 50° F. The evaporation obtained in the vegetable compartment is such that the daily water evaporation is (as a satisfactory proportion) 1/500 by weight of the maximum possible vegetable content of said vegetable compartment. By such a construction or method the presence of free water insures that the cells of the vegetables shall be provided with substantially the same amount of water which they originally contained when in their fresh condition, and the temperatures below 50° F. together with the restricted circulation of air through the vegetable compartment insures the prevention of the rapid growth of molds, yeast or bacteria on the vegetables.

As a specific embodiment, a domestic refrigerator cabinet may be provided having a relatively large air-circulating, insulated compartment 20 and in which may be provided a mechanical cooling unit 21. The compartment 20 may be of any suitable size, and compartments having from 3½ cu. ft. to 18 cu. ft. food storage capacity have been found satisfactory. The size of the cooling unit is such that the circulating air throughout the compartment is maintained at a temperature of 50° F. or less, while the air passing in contact with the cooling unit is chilled by contact with surfaces below 32° F. and preferably the surface of the cooling unit is maintained at a temperature of approximately 20° F. Within the compartment 20, a relatively small vegetable compartment 22 may be placed in such a position that the air passing in contact with the said compartment 22 is below 50° F. but is placed in such a position that the air from the cooling unit 21 and contacting the compartment 22 has warmed above 32° F. A satisfactory size for this relatively small vegetable compartment 22 has been found to be such that it will contain a maximum possible vegetable content of 5 lbs. The size of the compartment 22 is such that green vegetables, such as celery, radishes and lettuce, may be placed in the compartment 22 in the presence of free water. This free water may be provided either in the bottom of the compartment 22 as shown at 23, or the vegetables may be thoroughly sprinkled and washed before being placed in the compartment and while still wet are placed in the compartment 22 so that they carry a great deal of free water on their surface. With the compartment 22 sealed substantially so that no appreciable air circulation within the compartment 22 is provided, it has been found that relatively fresh vegetables may be satisfactorily kept for considerable periods of time, such as a week or so. However, if a restricted air passage into and out of said compartment 22 is provided, so that a daily water evaporation of (as a satisfactory proportion) 1/500 of the weight of the maximum possible vegetable content of said compartment 22 is provided, then the vegetables may be satisfactorily kept for periods of time substantially twice as long as without the air circulation. The restricted air circulation retards the rapid growth of molds, yeast or bacteria. Thus it is to be seen that by combining the low temperatures below 50° F. with restricted air passage or circulation, a very satisfactory method of and apparatus for refrigerating vegetables is provided.

In Fig. 1 the compartment 20 is provided with a mechanical cooling unit 21, for instance of the type disclosed in the patent to R. G. Osborn, No. 1,556,708, patented October 13, 1925. The relatively small vegetable compartment 22 may be placed in the position shown. Refrigerating machinery may be placed in the compartment behind the door shown at 24, being of the character to automatically maintain the refrigerant in the cooling unit 21 at substantially 20° F. If desired, shelves 25 and 26 may be provided for the storage of food in the compartment 20, and the shelf 25 may be stepped to hold a drip pan 27 underneath the cooling unit 21 to catch the water dripping from the cooling unit 21 during defrosting operations.

The vegetable compartment 22 may be of any suitable construction. Thus a substantially rectangular cross-sectional sleeve 28 may be provided and this sleeve may be closed at the back of the wall 29, but open at the front for the reception of a pan 30 provided with a handle carrying front 31 provided with a handle 32. If desired, a perforated false bottom 33 may be provided so that water may be placed below the bottom 33. The sleeve 28 may be provided with pedestals 33a for resting on the bottom of the compartment 20 or on any other portion within the compartment 20.

In the modification shown in Figs. 1, 2 and 3, the sleeve 22a is substantially rectangular in vertical cross-section with the exception that the top 28a of the sleeve is bent upwardly at the center as shown at 45 in order to insure a restricted air passage or circulation between the compartments 20 and 22a. Otherwise the structure shown in Figs. 1, 2 and 3 may be substantially as shown in Figs. 4, 5 and 6, it being understood that the relative size of the compartments and the size of the restricted air passage is such as to insure the temperature and evaporation heretofore described.

The vegetable compartment disclosed in Figs. 4, 5 and 6 inclusive, may be substantially hermetically sealed, if desired, when it is not necessary to maintain the vegetables in crisp condition for the maximum periods of time; but it is to be understood that if the maximum periods of time are desired, then these structures may be modified by providing means for preventing the closing of said structures completely in order to provide restricted air passage or circulation between compartments 20 and the vegetable compartment 22 or 22a of the character herein described.

The bottom of the sleeve 28a may be left open, merely leaving the flanges 28b for the support of the pan 30. This also permits a slight ventilation within the vegetable compartment.

While the form of embodiment of the invention as herein disclosed, constitutes a preferred form, it is to be understood that other forms might be adopted, all coming within the scope of the claims which follow.

What is claimed is as follows:

1. In a refrigerator wherein convection currents are set up by a mechanical unit normally maintained at a temperature below the freezing point of water, the method of preserving vegetables and the like which comprises storing the vegetables in the refrigerator in heat exchange relation with the convection currents to cool the said vegetables and limiting the circulation of said air into direct contact with the said vegetables so that moisture is removed from the vegetables at a rate substantially equal to 1/500 of the weight of said vegetables during a twenty-four hour period.

2. In a refrigerator wherein convection currents are set up by a mechanical unit normally maintained at a temperature below the freezing point of water, the method of preserving vegetables and the like which comprises storing the vegetables in the refrigerator in heat exchange relation with the said convection currents to cool the vegetables, and restricting the circulation of the air into direct contact with the vegetables so that only a substantially small quantity of moisture is removed from the vegetables during each twenty-four hour period, whereby the growth of molds and bacteria is materially retarded.

3. In a refrigerator wherein convection currents are set up by a mechanical unit normally maintained at a temperature below the freezing point of water, the method of preserving vegetables and the like which comprises sprinkling the vegetables with water, storing the sprinkled vegetables in the refrigerator in heat exchange relation with the said convection currents to cool the said vegetables, and restricting the circulation of air into direct contact with the vegetables so that only a substantially small quantity of moisture is removed from the vegetables during each twenty-four hour period, whereby the growth of molds and bacteria is materially retarded.

4. In a refrigerator wherein convection currents are set up by a mechanical unit normally maintained at a temperature below the freezing point of water, the method of preserving vegetables and the like which comprises sprinkling the said vegetables with water, storing the sprinkled vegetables in the refrigerator in heat exchange relation with the convection currents to cool the vegetables, and limiting the circulation of said air into direct contact with said vegetables so that moisture is removed from the vegetables at a rate substantially equal to 1/500 of the weight of the said vegetables during each twenty-four hour period.

5. In a refrigerator wherein convection currents are set up by a mechanical unit normally maintained below the freezing point of water, the method of preserving vegetables and the like which comprises moistening the vegetables, storing the moistened vegetables in heat exchange relation with the said convection currents to cool the vegetables and limiting the circulation of said air into direct contact with the said vegetables so that moisture is removed from the vegetables at a rate substantially equal to 1/500 of the weight of said vegetables during a twenty-four hour period.

6. In a refrigerator wherein convection currents are set up by a mechanical unit normally maintained below the freezing point of water, the method of preserving vegetables and the like which comprises moistening the vegetables, storing the moistened vegetables in heat exchange relation with the said convection currents to cool the vegetables and limiting the circulation of said air into direct contact with the said vegetables so that only a substantially small quantity of moisture is removed from the vegetables during each twenty-four hour period, whereby the growth of molds and bacteria is materially retarded.

7. In a mechanical refrigerator wherein convection currents are set up by a mechanical unit normally maintained at a temperature below the freezing point of water, the process of preserving vegetables and the like which comprises storing the vegetables in the refrigerator in heat exchange relation with the convection currents to cool the vegetables, maintaining a supply of free water in the presence of the vegetables, and restricting the circulation of the air into direct contact with the vegetables so that only a small amount of water is removed by the convection currents per twenty-four hour period whereby the growth of molds and bacteria is materially retarded.

In testimony whereof I hereunto affix my signature.

BERTRAM B. GEYER.